United States Patent
Li et al.

(10) Patent No.: US 12,309,068 B2
(45) Date of Patent: May 20, 2025

(54) METHOD FOR NETWORK TRANSMISSION FOR DETECTING UNNECESSARY REDUCTION OF BANDWIDTH, DEVICE, AND STORAGE MEDIUM

(71) Applicant: BEIJING BAIDU NETCOM SCIENCE TECHNOLOGY CO., LTD., Beijing (CN)

(72) Inventors: Zhaogeng Li, Beijing (CN); Gang Cheng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 251 days.

(21) Appl. No.: 17/974,816

(22) Filed: Oct. 27, 2022

(65) Prior Publication Data
US 2023/0049252 A1    Feb. 16, 2023

(30) Foreign Application Priority Data
Nov. 1, 2021  (CN) .......................... 202111282279.3

(51) Int. Cl.
*H04L 47/125* (2022.01)
*H04L 43/0882* (2022.01)

(52) U.S. Cl.
CPC ........ *H04L 47/125* (2013.01); *H04L 43/0882* (2013.01)

(58) Field of Classification Search
CPC ............... H04L 47/125; H04L 43/0882; H04L 43/0876; H04L 43/12
See application file for complete search history.

(56) References Cited

U.S. PATENT DOCUMENTS

| | | | |
|---|---|---|---|
| 10,389,639 B1 * | 8/2019 | Matthews | ............. H04L 47/125 |
| 2009/0201807 A1 | 8/2009 | Bugenhagen | |
| 2011/0211449 A1 | 9/2011 | Attar et al. | |
| 2017/0324664 A1 * | 11/2017 | Xu | ...................... H04L 12/4633 |

(Continued)

FOREIGN PATENT DOCUMENTS

| | | |
|---|---|---|
| CN | 104796350 | 7/2015 |
| CN | 108718283 | 10/2018 |

(Continued)

OTHER PUBLICATIONS

Chinese Office Action issued in corresponding Chinese Patent Application No. 202111282279.3, dated Oct. 31, 2022.

(Continued)

*Primary Examiner* — Chris Parry
*Assistant Examiner* — Steven C Nguyen
(74) *Attorney, Agent, or Firm* — Pillsbury Winthrop Shaw Pittman, LLP

(57) ABSTRACT

A method for network transmission, a device, and a storage medium, which relate to a field of a computer technology, in particular to a field of a network transmission technology. The method includes: detecting current loads of a plurality of peer ports of a network node in a network; determining a target peer port with a largest current load from the plurality of peer ports; marking a message currently transmitted by the target peer port, so as to obtain a marked message; and sending the marked message to a terminal corresponding to the marked message or a server corresponding to the marked message.

20 Claims, 8 Drawing Sheets

(56) References Cited

U.S. PATENT DOCUMENTS

| | | | | |
|---|---|---|---|---|
| 2020/0084155 A1* | 3/2020 | Song | ................... | H04L 49/9068 |
| 2020/0186465 A1* | 6/2020 | Dontula Venkata | ......................... | |
| | | | | H04L 41/0893 |
| 2022/0086035 A1* | 3/2022 | Devaraj | ................ | H04L 43/065 |
| 2024/0121202 A1* | 4/2024 | Li | .......................... | H04L 47/28 |

FOREIGN PATENT DOCUMENTS

| | | |
|---|---|---|
| CN | 108881056 | 11/2018 |
| CN | 109547341 | 3/2019 |
| CN | 110445722 | 11/2019 |
| CN | 110784415 | 2/2020 |
| CN | 113572655 | 10/2021 |

OTHER PUBLICATIONS

Jia, L. et al.: "A Dynamic Probability Mark Method of Congestion Control Based on Explicit Feedback", 2010 First International Conference on Networking and Distributed Computing, IEEE (2010).
Liu, M. et al.: "Layered Multicast with Multilevel Congestion Marking", Journal of System Simulation, vol. 19, No. 7 (2007).

\* cited by examiner

500

A rerouting information is sent to the source terminal sending the marked message, in response to the marked message from the network node being received, so that the source terminal transmits the marked message according to the rerouting information — 510

METHOD FOR NETWORK TRANSMISSION FOR DETECTING UNNECESSARY REDUCTION OF BANDWIDTH, DEVICE, AND STORAGE MEDIUM

This application claims priority to Chinese Patent Application No. 202111282279.3 filed on Nov. 1, 2021, which is incorporated herein in its entirety by reference.

TECHNICAL FIELD

The present disclosure relates to a field of a computer technology, in particular to a field of a network transmission technology. Specifically, the present disclosure relates to a method for network transmission, an electronic device, and a non-transitory computer-readable storage medium.

BACKGROUND

When data is transmitted through a network, there may be a plurality of alternative transmission paths, and a plurality of data that may be transmitted on different paths may be actually crowded on one path for transmission, which may result in an unnecessary reduction of a bandwidth of that path and affect a data transmission efficiency. In a related art, a method of detecting a generation of an unnecessary reduction of bandwidth is inefficient.

SUMMARY

The present disclosure provides a method for network transmission, a device, and a storage medium.

According to an aspect of the present disclosure, a method for network transmission is provided, including: detecting current loads of a plurality of peer ports of a network node in a network; determining a target peer port having a largest current load from the plurality of peer ports; marking a message currently transmitted by the target peer port, so as to obtain a marked message; and sending the marked message to a terminal corresponding to the marked message or a server corresponding to the marked message.

According to another aspect of the present disclosure, a method for network transmission is provided, including: sending, in response to a marked message from a network node being received, a rerouting information to a source terminal sending the marked message, so that the source terminal transmits the marked message according to the rerouting information.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method for network transmission as described above.

According to another aspect of the present disclosure, a non-transitory computer-readable storage medium having computer instructions therein is provided, and the computer instructions are configured to cause a computer to implement the method for network transmission as described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Figure 1:
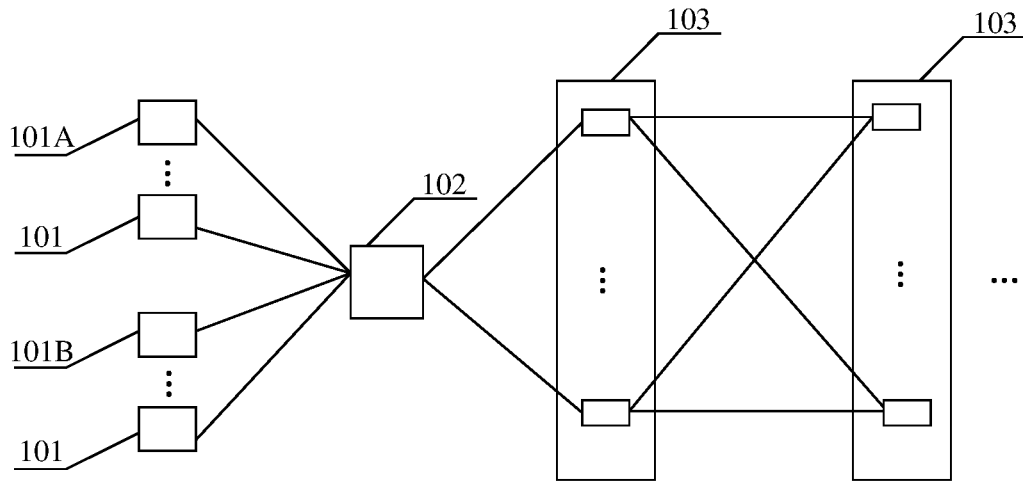
FIG. 1 shows an exemplary system architecture applicable to a method and an apparatus for network transmission according to embodiments of the present disclosure.

FIG. 1 schematically shows a system architecture of a method and an apparatus for network transmission according to embodiments of the present disclosure. It should be noted that FIG. 1 is only an example of the system architecture to which embodiments of the present disclosure may be applied to help those skilled in the art understand the technical content of the present disclosure, but it does not mean that embodiments of the present disclosure may not be applied to other devices, systems, environments or scenarios.

As shown in FIG. 1, a system architecture 100 according to such embodiments may include terminals 101, a server 102, and network nodes 103. A communication link may be provided between two adjacent network nodes 103. The terminals 101 may include a source terminal 101A sending data and a terminal 101B receiving data. The network nodes 103 may be switches or other devices that forward and transmit data. The terminals 101 may be mobile phones, computers, or the like. Two network nodes 103 are shown in the example of FIG. 1. Those skilled in the art may understand that more network nodes may be provided, which is not limited in the present disclosure.

The terminal 101, that is, the source terminal, may be used by a user to send data to a designated terminal 101, and the data may be transmitted from the source terminal to the designated terminal through a plurality of network nodes 103 according to a designated route.

It should be noted that the method for network transmission provided by embodiments of the present disclosure may be performed by a network node. Accordingly, the apparatus for network transmission provided by embodiments of the present disclosure may be arranged in a network node. The method for network transmission provided by embodiments of the present disclosure may also be performed by a server. Accordingly, the apparatus for network transmission provided by embodiments of the present disclosure may also be arranged in a server.

It should be understood that the number of terminals, server and network nodes in FIG. 1 is merely illustrative. According to implementation needs, any number of terminals and network nodes may be provided.

Embodiments of the present disclosure provide a method for network transmission. A method for network transmission according to exemplary embodiments of the present disclosure will be described below with reference to FIG. 2 to FIG. 8 in combination with the system architecture of FIG. 1. The method for network transmission according to embodiments of the present disclosure shown in FIG. 2 to FIG. 4 may be performed by, for example, the network node shown in FIG. 1, and the method for network transmission according to embodiments of the present disclosure shown in FIG. 5 to FIG. 8 may be performed by, for example, the server shown in FIG. 1.

It may be understood that in the technical solution of the present disclosure, an acquisition, a storage, a use, a processing, a transmission, a provision, a disclosure, and an application of user personal information involved comply with provisions of relevant laws and regulations, take essential confidentiality measures, and do not violate public order and good custom. In the technical solution of the present disclosure, authorization or consent is obtained from the user before the user's personal information is obtained or collected.

Figure 2:
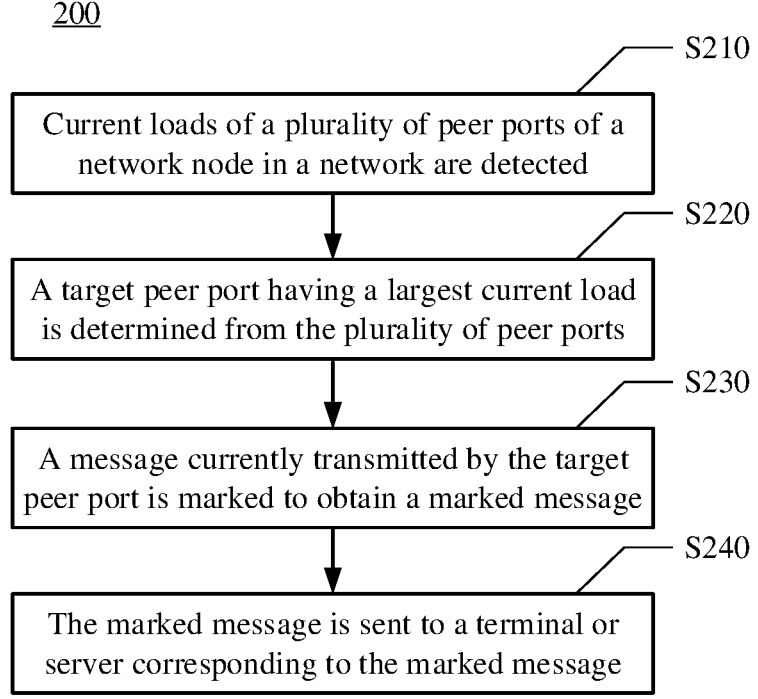
FIG. 2 shows a flowchart of a method for network transmission according to embodiments of the present disclosure.

FIG. 2 schematically shows a flowchart of a method 200 for network transmission according to embodiments of the present disclosure.

As shown in FIG. 2, a method 200 for network transmission of embodiments of the present disclosure may include, for example, operation S210 to operation S240.

In operation S210, current loads of a plurality of peer ports of a network node in a network are detected.

In operation S220, a target peer port having a largest current load is determined from the plurality of peer ports.

In operation S230, a message currently transmitted by the target peer port is marked to obtain a marked message.

In operation S240, the marked message is sent to a terminal or server corresponding to the marked message.

The above-mentioned "network node" may be a device capable of forwarding and transmitting data, such as a switch. A switch will be illustrated below by way of example for description.

It should be understood that, for example, a Clos architecture may provide a multi-level circuit switching network architecture of a non-blocking network, and a data network center built on a basis of the Clos architecture may connect each terminal to a switch, so as to form a data transmission network and achieve a data transmission between any number of terminals. When the switch forwards corresponding data, for example, when forwarding a message, a plurality of ports of the switch, that is, the above-mentioned "a plurality of peer ports" may be used to forward the message, and "a load of a peer port" may refer to an amount of data traffic transmitted through the peer port. Certainly, the "load of the peer port" may also be represented by other parameters of data transmission, which is not limited herein. Those skilled in the art may understand that the "peer port" refers to a port capable of forwarding or transmitting data at a network node on a transmission path connecting a source terminal and a specific terminal for receiving the data after it is determined that the data is to be transmitted from the source terminal to the specific terminal for receiving the data, and a plurality of such ports may be provided. The "marked message" may include an initial message sent by the source terminal and forwarded by the peer port of the network node, and marked data that is added when the initial message passes through the target peer port.

A link may be formed between two peer ports respectively belonging to two adjacent network nodes. The network includes a plurality of network nodes and a network node includes a plurality of peer ports. Two links adjacent in a data transmission direction are connected in sequence to form a transmission path for data transmission. It is possible to form a plurality of transmission paths along which data may be transmitted from a source terminal to a terminal receiving the data. In the network, a plurality of data that may be transmitted along different links are likely to choose the same link for transmission, and share a bandwidth of that link, which causes an unnecessary reduction in the bandwidth of the link, that is, a "hash collision" problem.

The "terminal corresponding to the marked message" mentioned in operation S240 refers to a receiving terminal that is determined when the marked message is sent from the source terminal. The "server corresponding to the marked message" refers to a server that is used to forward the marked message when the marked message is sent from the source terminal to the receiving terminal.

According to embodiments of the present disclosure, during the data transmission through the network, by determining the corresponding target peer port and marking the message currently transmitted by the target peer port, it is possible to position the target peer port having the largest load among the peer ports and to track the corresponding message. That is, a position where the "hash collision" problem occurs and the corresponding data may be detected. In addition, it is only needed to detect the peer port without traversing an entire transmission path of the data, so that the detection of "hash collision" is more efficient.

It should be understood that, after obtaining the marked message, the terminal corresponding to the marked message may perform a corresponding operation, such as sending a rerouting instruction to the source terminal sending the marked message, so as to avoid a "hash collision".

For example, "determining the target peer port having the largest current load from the plurality of peer ports" in operation S220 may include: determining the target peer port having the largest load by marking the peer ports. For example, the peer port having the largest current load among the plurality of peer ports may be marked with "1", that is, the peer port is determined as the target peer port, and the other peer ports among the plurality of peer ports may be marked with "0". If there is no peer port having the largest current load among the plurality of peer ports, it indicates that the loads of the peer ports are balanced, and each of the plurality of peer ports may be marked with "0".

Figure 3:
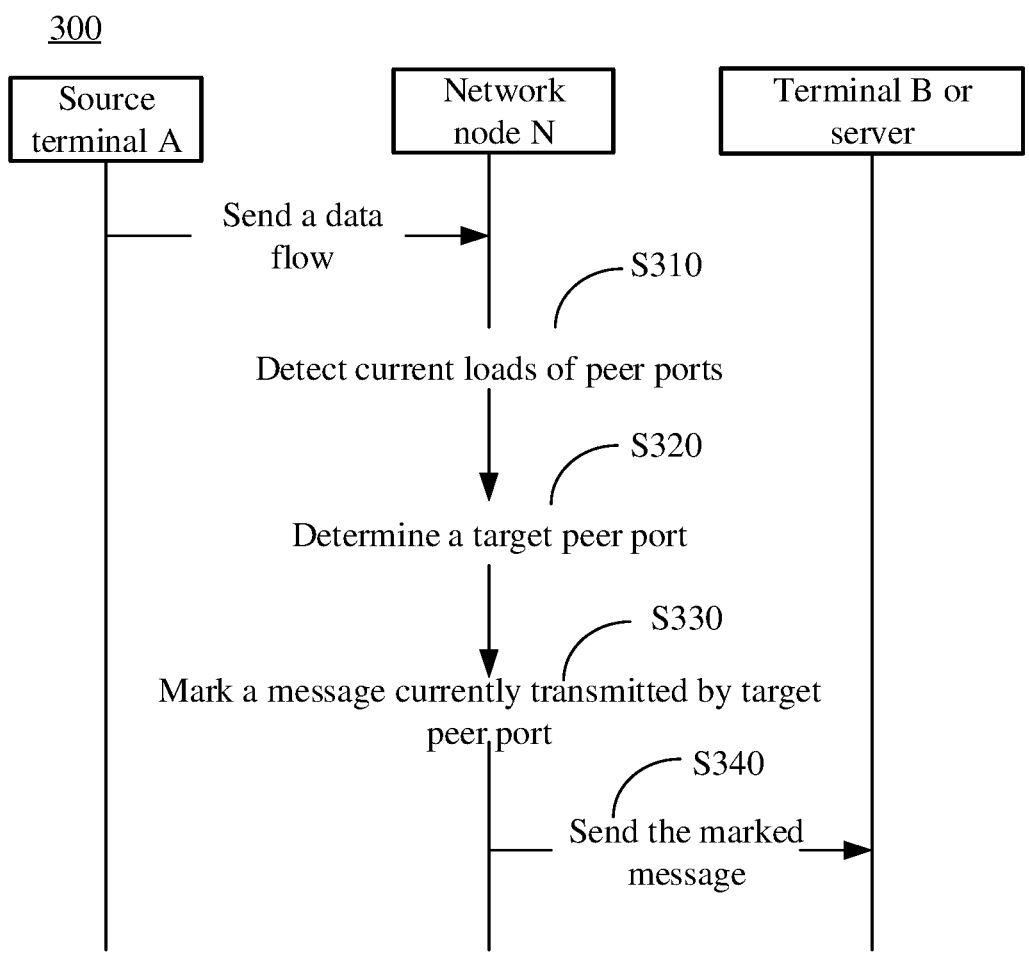
FIG. 3 shows an exemplary schematic diagram of a method for network transmission according to other embodiments of the present disclosure.

FIG. 3 schematically shows a schematic diagram of a method 300 for network transmission according to other embodiments of the present disclosure.

For example, in operation S330, marking the message currently transmitted by the target peer port to obtain the marked message may include: marking a plurality of messages belonging to a same data flow as the message currently transmitted by the target peer port, so as to obtain marked messages.

The "data flow" refers to a set of ordered data sequences, and a data flow may include a plurality of ordered messages. According to embodiments of the present disclosure, by marking a plurality of messages belonging to the same data flow, an order of the plurality of messages in the data flow may be maintained to avoid a problem of out-of-order arrival of a plurality of messages in the same data flow.

It should be noted that the switch may use a hash value of a header identification information such as an IP address and a port number of the message to determine which peer port the message is specifically sent to. For the same data flow, the header identification information used to calculate the hash value in the message is consistent, so that it may be ensured that the plurality of messages of the same data flow are transmitted through the same transmission path in the network, and the problem of out-of-order arrival of the plurality of messages in the same data flow may be avoided. In embodiments of the present disclosure, the plurality of messages belonging to the same data flow may be determined by identifying the same header identification information.

For example, the network may include a plurality of network nodes. In operation S310, detecting the loads of the plurality of peer ports may include: respectively detecting the current loads in a same direction at a plurality of peer ports of each network node.

It should be understood that the largest load may occur at each peer port of each network node N. Therefore, a current data transmission efficiency of the entire transmission path may not be evaluated only by the load of the current peer port.

According to embodiments of the present disclosure, the current loads of the plurality of peer ports of each network node N in the network may be detected as a reference for a subsequent operation. For example, when a rerouting operation is subsequently performed on the marked message, the detected current loads of the plurality of peer ports of each network node N in the network may be used as reference data for searching for a path with a higher data transmission efficiency.

It should be understood that the above-mentioned "same direction" includes the same direction of data input via a plurality of peer ports and the same direction of data output via a plurality of peer ports.

Figure 4:
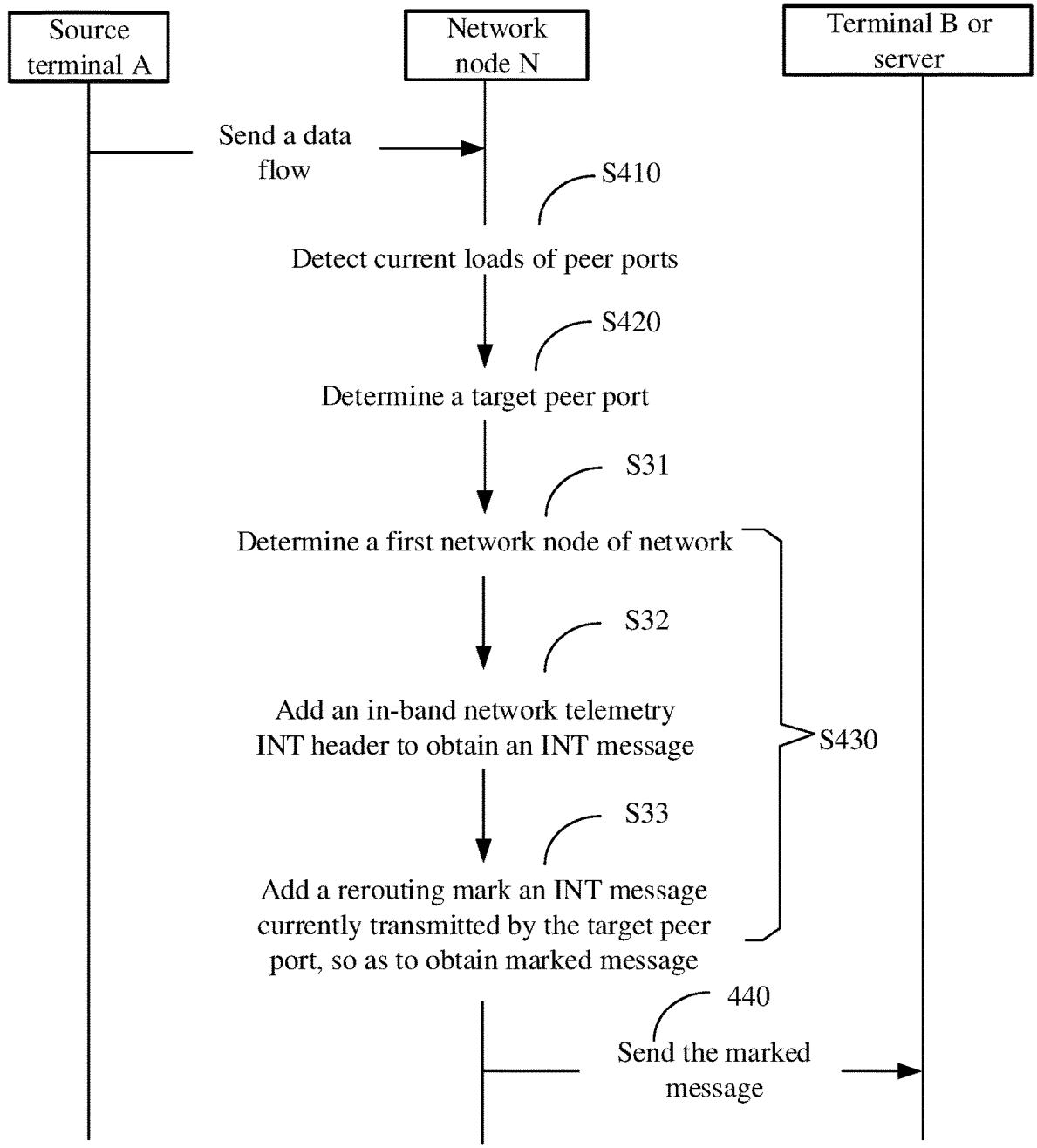
FIG. 4 shows an exemplary schematic diagram of a method for network transmission according to other embodiments of the present disclosure.

FIG. 4 schematically shows a schematic diagram of a method for network transmission according to other embodiments of the present disclosure.

As shown in FIG. 4, in a method 400 for network transmission according to embodiments of the present disclosure, in operation S430, marking the message currently transmitted by the target peer port to obtain the marked message may include operation S31 to operation S33.

In operation S31, a first network node of the network is determined.

In operation S32, an in-band network telemetry INT header is added to a message to be transmitted by the first network node, so as to obtain an INT message.

In operation S33, a rerouting mark is added to an INT message currently transmitted by the target peer port during a transmission of the INT message through the network, so as to obtain the marked message.

In the operation S32, INT refers to In-band Network Telemetry. In-band network telemetry technology is a framework that does not require a network control plane to intervene and does not require a network data plane to collect and report a network status.

It should be understood that, when the network has a plurality of network nodes, a transmission of message through the network may involve a plurality of network nodes, and the message may be transmitted through the network nodes in sequence. Therefore, the INT header needs to be added at the first network node of the network to the message transmitted by the first network node, so as not to miss any network node that the message may pass through during the transmission.

It should be noted that the INT header indicates a telemetry information, which is an information to be detected. In embodiments of the present disclosure, the telemetry information refers to a load information of the peer port. When the INT message containing the in-band network telemetry INT header is transmitted by the target peer port, it indicates that the transmission of the INT message is in a case that the port has the largest load. In this case, a rerouting mark may be added to the INT message, and the INT message with the rerouting mark is the marked message.

In the technical solution of embodiments of the present disclosure, marking the message currently transmitted by the target peer port through the in-band network telemetry technology is to mark a message being transmitted. Therefore, positioning the target peer port having the largest load and tracking the corresponding message are performed simultaneously with the message transmission in real time, which is faster and more timely.

Figures 5, 6:
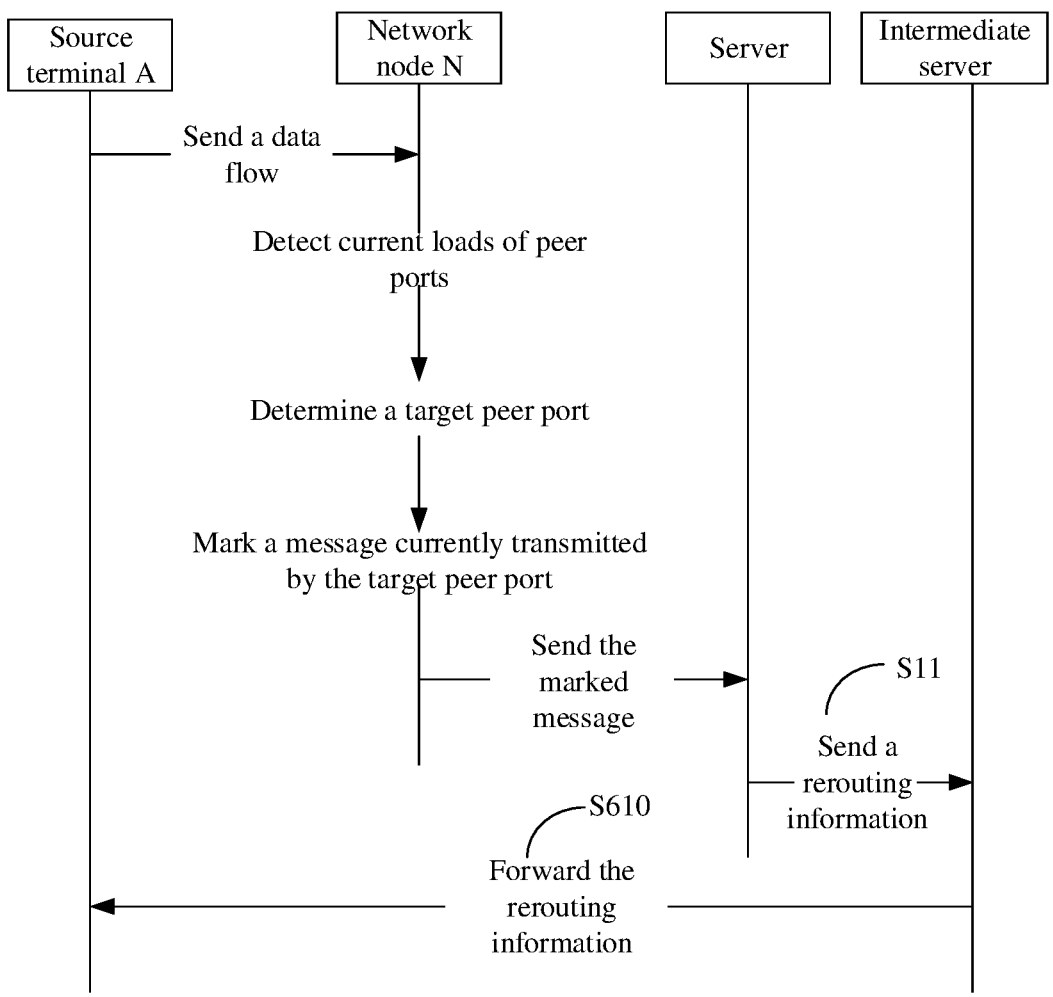
FIG. 5 shows a flowchart of a method for network transmission according to other embodiments of the present disclosure.
FIG. 6 shows an exemplary schematic diagram of a method for network transmission according to other embodiments of the present disclosure.

FIG. 5 shows a flowchart of a method 500 for network transmission according to other embodiments of the present disclosure.

As shown in FIG. 5, the method 500 for network transmission includes operation S510.

In operation S510, a rerouting information is sent to the source terminal sending the marked message, in response to the marked message from the network node being received, so that the source terminal transmits the marked message according to the rerouting information.

According to embodiments of the present disclosure, after the marked message is received, it indicates that the transmission path of the marked message includes a link with an unnecessary reduction of bandwidth which causes a low efficiency in data transmission, and that the above-mentioned "hash collision" occurs. The rerouting information that is sent by the server receiving the message to the source terminal may instruct the source terminal to retransmit the marked message, so that the marked message may be retransmitted along a new path different from the above-mentioned marked transmission path on which "hash collision" occurs, so as to avoid the "hash collision".

The above-mentioned "the source terminal transmits the marked message according to the rerouting information" refers to that an upper-level service of the source terminal performs rerouting, and the source terminal retransmits the marked message according to a transmission path for rerouting.

FIG. 6 shows a schematic diagram of a method 600 for network transmission according to other embodiments of the present disclosure.

As shown in FIG. 6, in operation S610, sending a rerouting information to a source terminal A sending the marked message may include operation S11.

In operation S11, the rerouting information is sent to an intermediate server, so that the intermediate server forwards the rerouting information to the source terminal A.

For example, the intermediate server may further generate a transmission path for rerouting.

The above-mentioned "forwarding" may include active forwarding by the intermediate server, that is, the intermediate server may directly send a rerouting information to the source terminal A after obtaining the rerouting information. The forwarding may also include passive forwarding by the intermediate server, that is, the intermediate server may wait for a query and a request of the source terminal A after obtaining the rerouting information, and forward the rerouting information to the source terminal A in response to the query and the request of the source terminal A.

For example, the rerouting information may include an information indicating that rerouting is required, or a transmission path information. When the rerouting information includes the information indicating that rerouting is required, the transmission path for rerouting may be determined by the upper-level service of the source terminal A sending the marked message after the rerouting information is sent to the source terminal A sending the marked message. When the rerouting information includes the transmission path information, the transmission path may be determined by the above-mentioned intermediate server.

For example, the transmission path information may indicate a new path information different from the above-mentioned marked transmission path on which "hash collision" occurs. It should be understood that in a case of dynamically adjusting the transmission path, it is possible to determine a transmission path without unnecessary reduction of bandwidth, that is, to obtain a transmission path with a higher data transmission efficiency, so as to avoid the above-mentioned "hash collision". The transmission path information may further indicate an information of a transmission path without unnecessary reduction of bandwidth, that is, a transmission path with a higher data transmission efficiency may be obtained to avoid the above-mentioned "hash collision".

Figure 7:
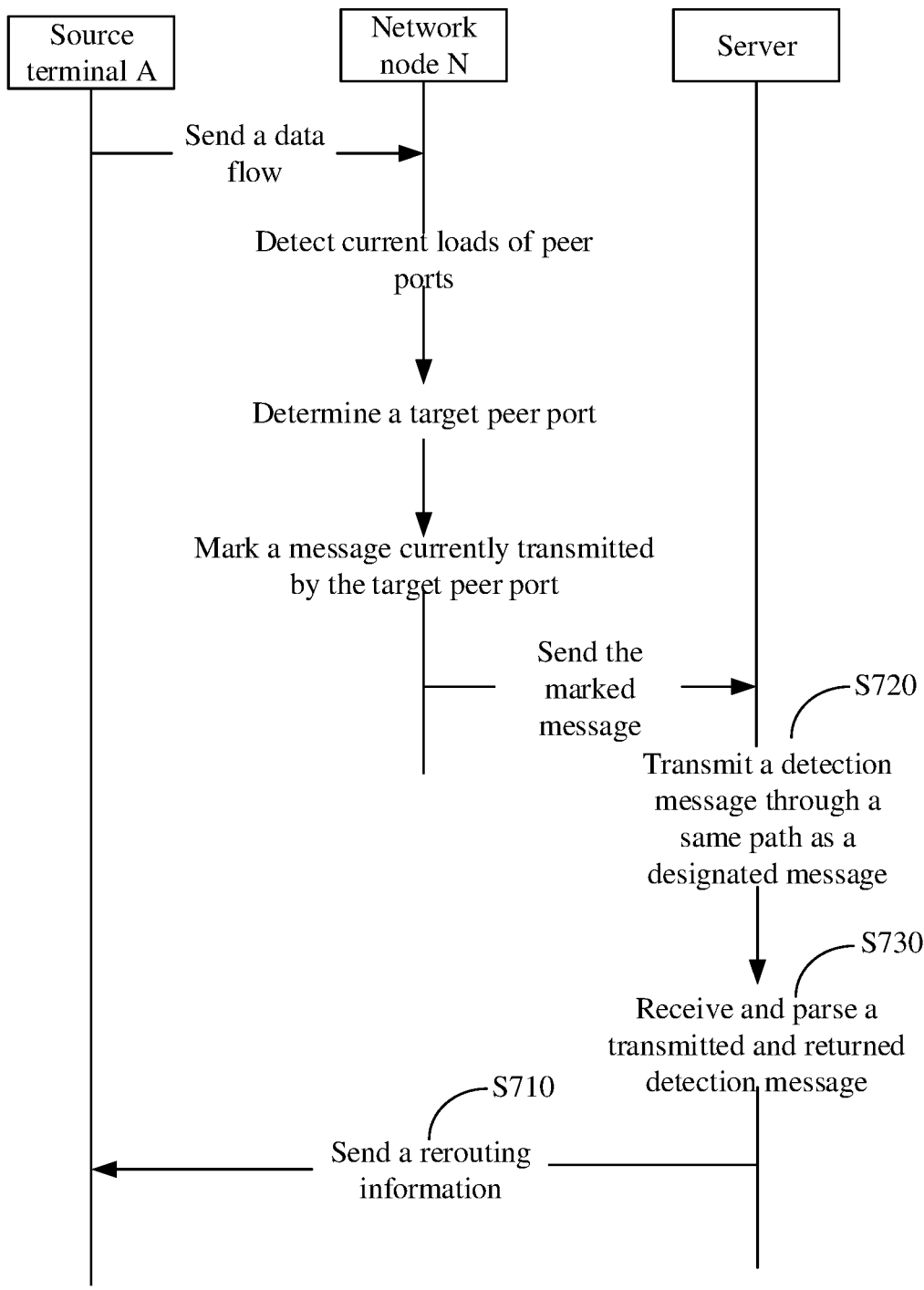
FIG. 7 shows an exemplary schematic diagram of a method for network transmission according to other embodiments of the present disclosure.

FIG. 7 schematically shows a schematic diagram of a method for network transmission according to other embodiments of the present disclosure.

As shown in FIG. 7, a method 700 for network transmission according to embodiments of the present disclosure further includes operation S720 and operation S730.

In operation S720, a detection message is transmitted through a same path as a designated message.

In operation S730, a transmitted and returned detection message is received and parsed.

It should be understood that in operation S720, the detection message is also a type of message. A difference between the designated message and the detection message is that the designated message is used to transmit data, while the detection message is used to detect the transmission path. In the technical solution of embodiments of the present disclosure, the detection of the target peer port having the largest load may be performed in a form of the detection message. Specifically, when it is required to detect a transmission path of a certain message, that is, the designated message, the detection message may be transmitted on the same path. The detection message may also be marked when it is transmitted to the target peer port having the largest load. Therefore, the detection message may contain an information of the corresponding transmission path after the transmission is completed. The information of the corresponding transmission path may be obtained by parsing the transmitted and returned detection message, and the information of the transmission path may specifically include the load information of the peer port.

For example, the method 700 for network transmission according to embodiments of the present disclosure may further include generating a detection message, and transmitting the detection message after the detection message is generated.

Figure 8:
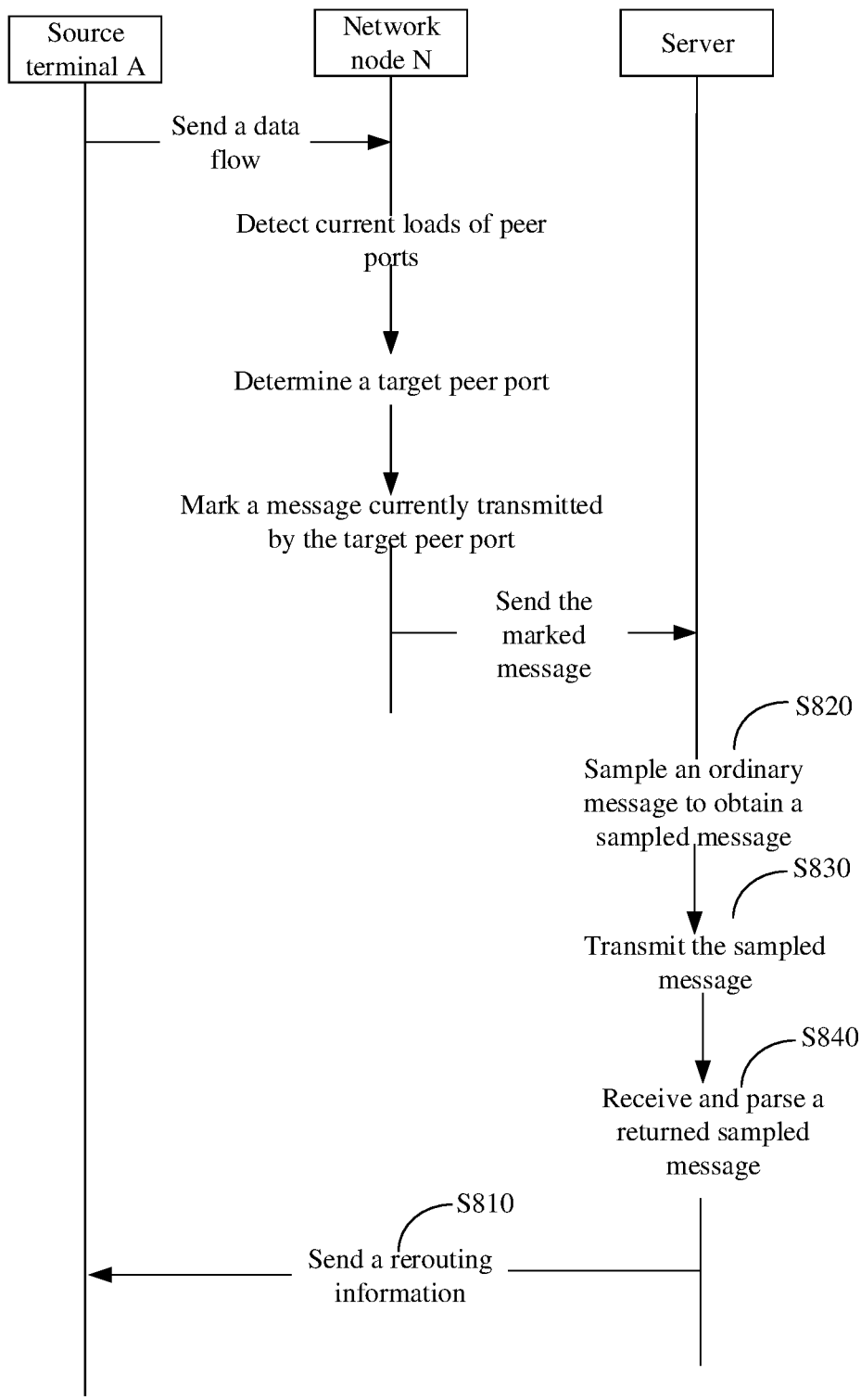
FIG. 8 shows an exemplary schematic diagram of a method for network transmission according to other embodiments of the present disclosure.

FIG. 8 schematically shows a schematic diagram of a method for network transmission according to other embodiments of the present disclosure.

As shown in FIG. 8, a method 800 for network transmission according to embodiments of the present disclosure may further include operation S820 to operation S840.

In operation S820, an ordinary message is sampled to obtain a sampled message.

In operation S830, the sampled message is transmitted.

In operation S840, a returned sampled message is received and parsed.

In the operation S820, the ordinary message refers to a message normally used for data transmission, and the sampled message refers to a message obtained after sampling and selecting from ordinary message. The two messages are actually consistent, but the message obtained after sampling and selecting has both functions of a normal data transmission and a detection of a current transmission path.

It should be understood that the sampled message is also a type of message. In the technical solution of embodiments of the present disclosure, the detection of the target peer port having the largest load may be performed in a form of the sampled message. Specifically, an ordinary message may be sampled to obtain a sampled message, and the sampled message may be marked when transmitted to the target peer port having the largest load. The information of the corresponding transmission path may be obtained by parsing the sampled message, and the information of the transmission path may specifically include the load information of the peer port.

Figure 9:
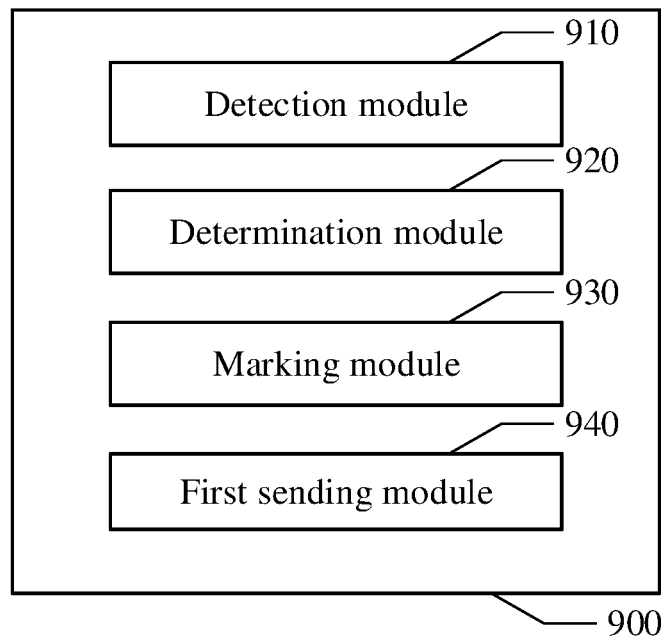
FIG. 9 shows a block diagram of an apparatus for network transmission according to embodiments of the present disclosure.

As shown in FIG. 9, an apparatus 900 for network transmission in embodiments of the present disclosure includes, for example, a detection module 910, a determination module 920, a marking module 930, and a first sending module 940.

The detection module 910 may be used to detect current loads of a plurality of peer ports of a network node in a network. According to embodiments of the present disclosure, the detection module 910 may perform, for example, the operation S210 described above with reference to FIG. 2, which will not be repeated here.

The determination module 920 may be used to determine a target peer port having a largest current load from the plurality of peer ports. According to embodiments of the present disclosure, the determination module 920 may perform, for example, the operation S220 described above with reference to FIG. 2, which will not be repeated here.

The marking module 930 may be used to mark a message currently transmitted by the target peer port, so as to obtain a marked message. According to embodiments of the present disclosure, the marking module 930 may perform, for example, the operation S230 described above with reference to FIG. 2, which will not be repeated here.

The first sending module 940 may be used to send the marked message to a terminal corresponding to the marked message or a server corresponding to the marked message. According to embodiments of the present disclosure, the first sending module 940 may perform, for example, the operation S240 described above with reference to FIG. 2, which will not be repeated here.

According to embodiments of the present disclosure, the marking module may include a marking sub-module. The marking sub-module is used to mark a plurality of messages belonging to a same data flow as the message currently transmitted by the target peer port, so as to obtain the marked message.

According to embodiments of the present disclosure, the network includes a plurality of network nodes; and the detection module may include a detection sub-module. The detection sub-module is used to detect current loads in a same direction at the plurality of peer ports of each network node, respectively.

According to embodiments of the present disclosure, the marking module may include a determination sub-module, a first addition sub-module, and a second addition sub-module.

The determination sub-module may be used to determine a first network node of the network.

The first addition sub-module may be used to add an in-band network telemetry INT header to a message to be transmitted by the first network node, so as to obtain an INT message.

The second addition sub-module may be used to add a rerouting mark to an INT message currently transmitted by the target peer port during a transmission of the INT message through the network, so as to obtain the marked message.

Figure 10:
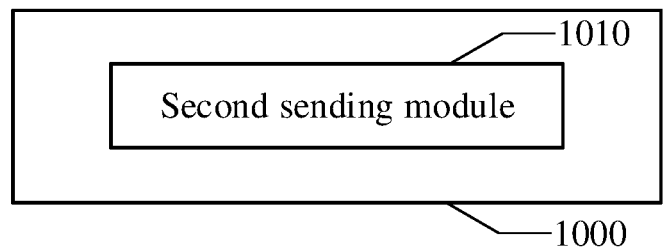
FIG. 10 shows a block diagram of an apparatus for network transmission according to other embodiments of the present disclosure.

As shown in FIG. 10, an apparatus 1000 for network transmission of other embodiments of the present disclosure includes, for example, a second sending module 1010. The second sending module 1010 is used to send, in response to a marked message from a network node being received, a rerouting information to a source terminal sending the marked message, so that the source terminal transmits the marked message according to the rerouting information.

According to embodiments of the present disclosure, the second sending module 1010 may include a second sending sub-module. The second sending sub-module is used to send the rerouting information to an intermediate terminal, so that the intermediate terminal forwards the rerouting information to the source terminal.

According to embodiments of the present disclosure, the rerouting information includes an information indicating that rerouting is required, or a transmission path information.

According to embodiments of the present disclosure, the apparatus for network transmission may further include a first transmission module and a first parsing module.

The first transmission module may be used to transmit a detection message on a same path as a designated message.

The first parsing module may be used to receive and parse a transmitted and returned detection message.

According to embodiments of the present disclosure, the apparatus for network transmission may further include a sampling module, a second transmission module, and a second parsing module.

The sampling module may be used to sample an ordinary message to obtain a sampled message.

The second transmission module may be used to transmit the sampled message.

The second parsing module may be used to receive and parse a returned sampled message.

According to embodiments of the present disclosure, the present disclosure further provides an electronic device, a readable storage medium, and a computer program product.

Figure 11:
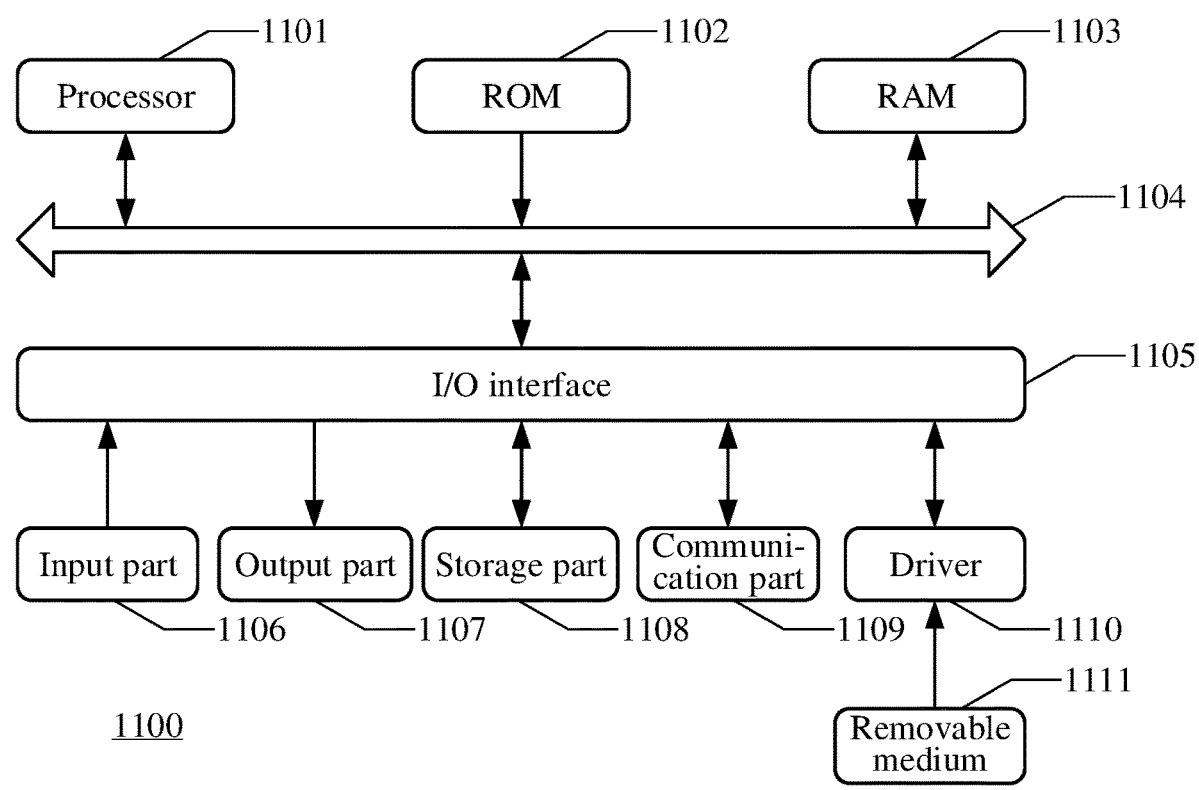
FIG. 11 shows a block diagram of an electronic device for implementing a method for network transmission of embodiments of the present disclosure.

FIG. 11 shows a schematic block diagram of an exemplary electronic device 1100 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 11, the electronic device 1100 includes a computing unit 1101 which may perform various appropriate actions and processes according to a computer program stored in a read only memory (ROM) 1102 or a computer program loaded from a storage unit 1108 into a random access memory (RAM) 1103. In the RAM 1103, various programs and data necessary for an operation of the electronic device 1100 may also be stored. The computing unit 1101, the ROM 1102 and the RAM 1103 are connected to each other through a bus 1104. An input/output (I/O) interface 1105 is also connected to the bus 1104.

A plurality of components in the electronic device 1100 are connected to the I/O interface 1105, including: an input unit 1106, such as a keyboard, or a mouse; an output unit 1107, such as displays or speakers of various types; a storage unit 1108, such as a disk, or an optical disc; and a communication unit 1109, such as a network card, a modem, or a wireless communication transceiver. The communication unit 1109 allows the electronic device 1100 to exchange information/data with other devices through a computer network such as Internet and/or various telecommunication networks.

The computing unit 1101 may be various general-purpose and/or dedicated processing assemblies having processing and computing capabilities. Some examples of the computing unit 1101 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1101 executes various methods and steps described above, such as the method for network transmission. For example, in some embodiments, the method for network transmission may be implemented as a computer software program which is tangibly embodied in a machine-readable medium, such as the storage unit 1108. In some embodiments, the computer program may be partially or entirely loaded and/or installed in the electronic device 1100 via the ROM 1102 and/or the communication unit 1109. The computer program, when loaded in the RAM 1103 and executed by the computing unit 1101, may execute one or more steps in the method for network transmission described above. Alternatively, in other embodiments, the computing unit 1101 may be configured to perform the method for network transmission by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server for distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method for network transmission, the method comprising:
    detecting current loads of a plurality of peer ports of a network node in a network;
    determining a target peer port having a largest current load from the plurality of peer ports;
    in response to detecting that an initial message passes through the target peer port, marking the initial message currently transmitted by the target peer port, so as to obtain a marked message, the marking the initial message comprising:
        adding an in-band network telemetry INT header to a message to be transmitted by the network, so as to obtain an INT message; and
        adding a rerouting mark to an INT message currently transmitted by the target peer port during a transmission of the INT message through the network, so as to obtain the marked message; and
    sending the marked message to a terminal corresponding to the marked message or a server corresponding to the marked message.

2. The method according to claim 1, wherein the marking the initial message currently transmitted by the target peer port, so as to obtain a marked message comprises marking a plurality of messages belonging to a same data flow as the initial message currently transmitted by the target peer port, so as to obtain the marked message.

3. The method according to claim 1, wherein the network comprises a plurality of network nodes; and the detecting current loads of a plurality of peer ports comprises detecting current loads in a same direction at the plurality of peer ports of each network node, respectively.

4. The method according to claim 2, wherein the network comprises a plurality of network nodes; and the detecting current loads of a plurality of peer ports comprises detecting current loads in a same direction at the plurality of peer ports of each network node, respectively.

5. A method for network transmission, the method comprising:
sending, in response to a marked message from a network node being received, a rerouting information to a source terminal sending the marked message, so that the source terminal transmits the marked message according to the rerouting information,
wherein the marked message is obtained by marking an initial message currently transmitted by a target peer port in response to a detection that the initial message passes through the target peer port, the target peer port having a largest current load from a plurality of peer ports of a network node in a network and
wherein the marking the initial message includes:
addition of an in-band network telemetry INT header to a message to be transmitted by the network, so as to obtain an INT message; and
addition of a rerouting mark to an INT message currently transmitted by the target peer port during a transmission of the INT message through the network, so as to obtain the marked message.

6. The method according to claim 5, wherein the sending a rerouting information to a source terminal sending the marked message comprises sending the rerouting information to an intermediate terminal, so that the intermediate terminal forwards the rerouting information to the source terminal.

7. The method according to claim 5, wherein the rerouting information comprises an information indicating that rerouting is required, or a transmission path information.

8. The method according to claim 5, further comprising:
transmitting a detection message on a same path as a designated message; and
receiving and parsing a transmitted and returned detection message.

9. The method according to claim 5, further comprising:
sampling an ordinary message to obtain a sampled message;
transmitting the sampled message; and
receiving and parsing a returned sampled message.

10. The method according to claim 6, wherein the rerouting information comprises an information indicating that rerouting is required, or a transmission path information.

11. The method according to claim 6, further comprising:
transmitting a detection message on a same path as a designated message; and
receiving and parsing a transmitted and returned detection message.

12. The method according to claim 6, further comprising:
sampling an ordinary message to obtain a sampled message;
transmitting the sampled message; and
receiving and parsing a returned sampled message.

13. An electronic device, comprising:
at least one processor; and
a memory communicatively connected to the at least one processor, wherein the memory stores instructions executable by the at least one processor, and the instructions, when executed by the at least one processor, cause the at least one processor to implement at least the method according to claim 1.

14. The electronic device according to claim 13, wherein the instructions are further configured to cause the at least one processor to mark a plurality of messages belonging to a same data flow as the initial message currently transmitted by the target peer port, so as to obtain the marked message.

15. The electronic device according to claim 13, wherein the instructions are further configured to cause the at least one processor to detect current loads in a same direction at the plurality of peer ports of each network node, respectively.

16. An electronic device, comprising:
at least one processor; and
a memory communicatively connected to the at least one processor, wherein the memory stores instructions executable by the at least one processor, and the instructions, when executed by the at least one processor, cause the at least one processor to implement at least the method according to claim 5.

17. A non-transitory computer-readable storage medium having computer instructions therein, wherein the computer instructions are configured to cause a computer system to implement at least the method according to claim 5.

18. A non-transitory computer-readable storage medium having computer instructions therein, wherein the computer instructions are configured to cause a computer system to implement at least the method according to claim 1.

19. The non-transitory computer-readable storage medium according to claim 18, wherein the instructions are further configured to cause the computer system to mark a plurality of messages belonging to a same data flow as the initial message currently transmitted by the target peer port, so as to obtain the marked message.

20. The non-transitory computer-readable storage medium according to claim 18, wherein the network comprises a plurality of network nodes, and wherein the instructions are further configured to cause the computer system to detect current loads in a same direction at the plurality of peer ports of each network node, respectively.

* * * * *